J. GITSHAM.
PROCESS FOR THE RECOVERY OF GOLD AND SILVER FROM ANTIMONIAL, ARSENICAL, AND OTHER GOLD BEARING ORES.
APPLICATION FILED JUNE 2, 1911.
1,068,646.
Patented July 29, 1913.
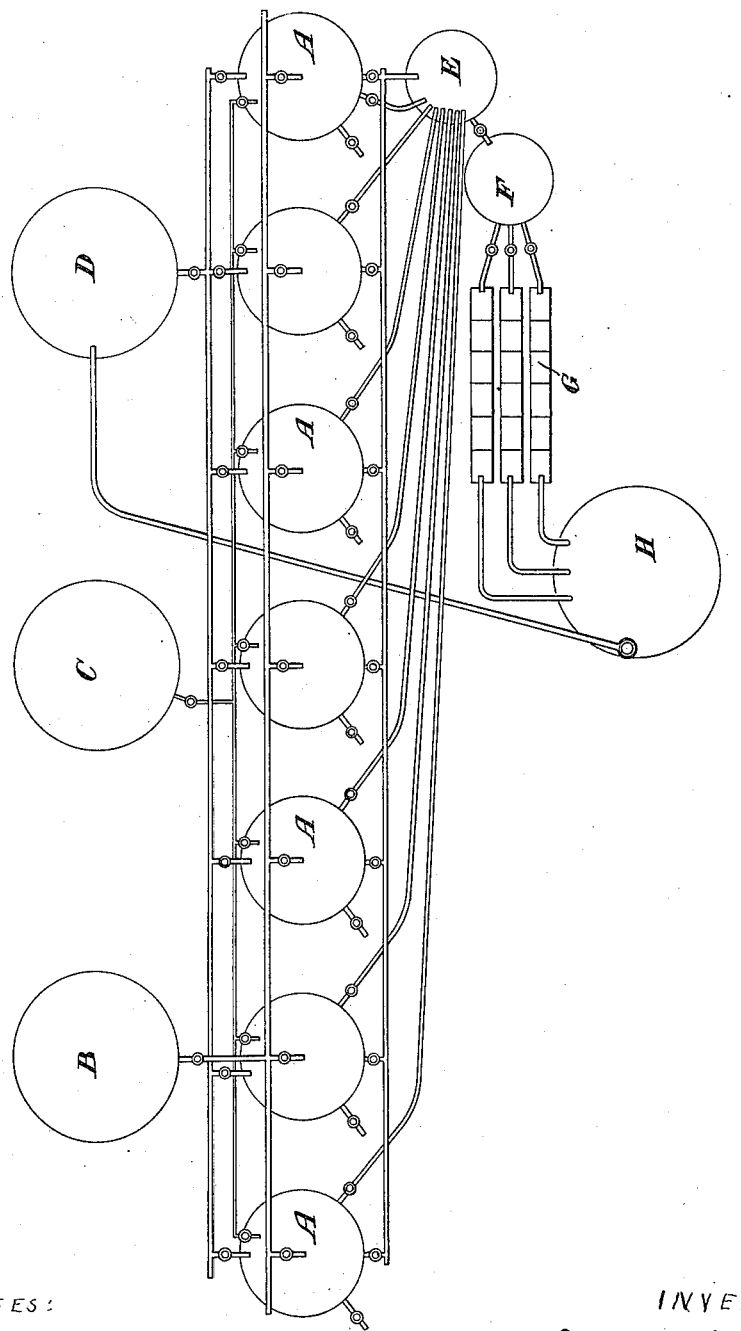
WITNESSES:
John C. Sanders
John A. Percival.
INVENTOR:
By James Gitsham
ATTY.

UNITED STATES PATENT OFFICE

JAMES GITSHAM, OF MOONEE PONDS, VICTORIA, AUSTRALIA, ASSIGNOR TO GITSHAM GOLD EXTRACTION COMPANY, LTD., OF MELBOURNE, AUSTRALIA, A CORPORATION OF VICTORIA, AUSTRALIA.

PROCESS FOR THE RECOVERY OF GOLD AND SILVER FROM ANTIMONIAL, ARSENICAL, AND OTHER GOLD-BEARING ORES.

1,068,646.   Specification of Letters Patent.   Patented July 29, 1913.

Application filed June 2, 1911. Serial No. 630,916.

*To all whom it may concern:*

Be it known that I, JAMES GITSHAM, a subject of the King of Great Britain and Ireland, residing at No. 57 Wilson street, Moonee Ponds, in the British State of Victoria, Commonwealth of Australia, metallurgist, have invented a new and useful Improved Process for the Recovery of Gold and Silver from Antimonial, Arsenical, and other Gold-Bearing Ores, of which the following is a specification.

This invention consists of a process for recovering gold and silver from certain finely pulverized refractory gold and silver bearing ores containing say sulfids of copper, antimonial ores, sulfur or arsenic or a combination of such minerals or substances.

The invention comprises the utilization of the selective action of hydrocyanic acid in dissolving the gold and silver contents of the pulverized ore under treatment, and further the process permits of the regeneration of cyanid from the solution employed.

The hydrocyanic acid above mentioned is the active dissolving or selective agent in the present process; and it is formed by a weak solution of cyanid combining with the acid contained in the ore as a result of oxidation due to weathering or other causes. Or the necessary amount of acid may be directly added as will be more fully hereinafter described. This combination of a cyanid with an acid capable of decomposing the cyanid to give hydrocyanic acid has never before been commercially employed as the agent for dissolving gold and silver from gold and silver bearing ores. The said hydrocyanic acid solution is formed during the working of the process and hence it can be employed successfully and economically to treat complex or refractory ores of the class herein specified or other classes of ore which, if treated by the usual cyanid or other gold and silver dissolving methods, would be too costly to be commercially practicable.

The proper conditions for carrying out this process in the case of any given ore are ascertained and controlled in practice by what is termed the "combination test" which is as follows: A water wash is put on the ore and allowed to percolate through it to remove the excess of acidity. This is repeatedly tested from time to time to determine the amount of cyanid-destroying acids present by adding an aliquot part of the wash solution to a definite quantity of standard cyanid solution, and then titrating the resulting mixed solution for cyanid with standard silver nitrate solution using potassium iodid as indicator, whereby the amount of cyanid destroyed can be determined.

When the tests show the proper degree of acidity in the ore, the body of ore is ready for treatment, the remaining acid in the ore being utilized for combination with the cyanid and the formation of hydrocyanic acid. The proper degree of acidity of the ore is attained when the test shows that upon adding to the ore the proper volume of alkali cyanid solution of the necessary concentration, the amount of acid in the ore is approximately equivalent chemically to the cyanid to be added. In other words, there should be sufficient acid present to decompose the cyanid in the added solution with the production of hydrocyanic acid, and to neutralize the alkalinity of the cyanid solution. Most advantageously the decomposing acid should be in slight excess so that the resulting solvent solution may be slightly acid in reaction. Hydrocyanic acid itself is a very weak acid without any marked acid reaction. The point at which the acidity of the ore is found by test to satisfy the foregoing requirements is termed, for the sake of convenience, the combination point. It is apparent therefore that the solvent solution employed in treating the ore may be described as approximately free from strong mineral acids in excess, though, as stated, a slight acidity is advantageous.

When the ore is in a neutral or alkaline state a preliminary acid wash may be necessary to remove any soluble alkaline substances; and when the ore being treated does not contain the necessary available acid or acid-forming ingredients to decompose cyanid and produce hydrocyanic acid, then sulfuric acid is added in the proportion of 100 parts of sulfuric acid to 131 parts of cyanid of potassium, these proportions being, as is apparent, substantially chemically equivalent, with the strong mineral acid in slight excess. These proportions will be varied to suit the class of ore being treated as it is necessary to maintain the acid proportions slightly in excess of the cyanid.

The hydrocyanic acid solutions after having dissolved values from the ore, are drawn off the leaching vats by the ordinary filtration methods. The solutions are then made alkaline by the addition of lime or some other alkali in sufficient proportions to neutralize the acid present. By this method a considerable proportion of the combined cyanogen in the solvent is liberated as free alkali cyanid which after passing through the precipitation boxes, is then in a condition to again combine with the acid within the ore, hydrocyanic acid being formed as before and serving to dissolve the gold or silver.

The method of working the process will now be described aided by a reference to the accompanying drawing which shows a diagrammatic plan of a suitable treatment plant.

In working this process, the material requiring treatment and consisting either of crude ore, tailings (or possibly slimes) crushed to a degree of fineness suitable for successful leaching, is passed into open, or if desired closed vats A to provide as far as possible a good leaching product. The ore may first be given a preliminary treatment to insure its containing the proper proportion of available acid for the subsequent decomposition of cyanid with formation of hydrocyanic acid. An ordinary alkali may be added if necessary to the ore in certain proportions to sufficiently neutralize the excess of acidity of the solution, but some ores which have been treated do not require this addition. A continuous and steady flow of neutral or alkaline water is supplied from the vat B to the crushed ore in the vats A until the ore is sufficiently washed to comply with the conditions of the "combination test" hereinbefore described. Should the acid in the ore be insufficient in quantity to combine with the cyanid to form hydrocyanic acid to dissolve the gold, then the requisite proportion of a suitable acid, preferably sulfuric acid is added from vat C to form hydrocyanic acid. The flow of water from vat B is then discontinued and a weak solution of cyanid (varying in strength from .01 to .3%) is added from vat D to the liquor in vat A which is allowed to settle until all the air bubbles are displaced or driven out. The liquor from vat A carrying dissolved values is then drawn off and run direct to the alkaline cover sump E wherein by the addition of an alkali the hydrocyanic acid is neutralized and a portion of the cyanid regenerated. The solution is then drawn off to a cyanid sump F where it is made up to the strength requisite for precipitation purposes, said solution being then allowed to flow through the precipitation boxes G wherein the gold and silver is precipitated on zinc shavings or some other precipitating agent. This solution after leaving the boxes G flows to the storage sump H and mixing with the original solution therein is pumped to the mixing vat D and if desirable is made up or revivified to the requisite strength with additional cyanid and reapplied to the ore, the operation being cyclical.

I wish it to be understood that, in operating upon oxidized ores, from the first application of the cyanid solution to the ore to the final water washing, the ore must not be exposed to the atmosphere; that is to say during that period the ore must be covered by the solution. The quantity of solution required to dissolve the extractable gold and silver will vary according to the nature of the ore under treatment, while the gold and silver in the boxes is removed by the ordinary methods.

Having now described my invention what I claim as new and desire to secure by Letters Patent is—

1. The process of extracting values from ores bearing precious metals which comprises subjecting such an ore to the solvent action of a solution containing hydrocyanic acid as the active solvent agent, said solution being approximately free from strong mineral acids.

2. The process of extracting values from ores bearing precious metals which comprises subjecting such an ore to the solvent action of a solution containing hydrocyanic acid as the active solvent agent, said solution being approximately free from alkali cyanids and strong mineral acids.

3. The process of extracting values from ores bearing precious metals which comprises subjecting such an ore to the solvent action of a solution containing free hydrocyanic acid as the active solvent agent, said solution being faintly acid in reaction.

4. The hereindescribed process which comprises bringing into reaction approximately chemically equivalent quantities of an alkali cyanid and an acid capable of decomposing the same, thereby producing a solution containing hydrocyanic acid, and treating ore containing precious metals with the solution thus obtained to extract values from said ore.

5. The hereindescribed process which comprises bringing into reaction approximately chemically equivalent quantities of an alkali cyanid and an acid capable of decomposing the same, the cyanid-decomposing acid being present in slight excess, thereby producing a slightly acid reacting solution containing hydrocyanic acid, and treating ore containing precious metals with the solution thus obtained to extract values from said ore.

6. The process of treating refractory ores bearing gold and silver which comprises treating a body of such ore containing an available acid with a solution containing an amount of alkali cyanid approximately equivalent chemically to the available acid present in said body of ore, whereby hydrocyanic acid is formed to act as the solvent agent, withdrawing the solvent solution from the ore, and recovering values contained in said solution.

7. The process of treating refractory ores bearing gold and silver which comprises preliminarily treating a body of such ore to insure its containing a predetermined proportion of an available acid capable of decomposing an alkali cyanid, subjecting the ore thus prepared to the action of a solution containing an amount of alkali cyanid substantially equivalent chemically to the available acid present in the ore, whereby a solution containing hydrocyanic acid is obtained, and recovering values from the resulting solvent solution.

8. The process of treating refractory ores bearing gold and silver which comprises preliminarily treating a body of such ore to insure its containing a predetermined proportion of an available acid, subjecting the ore thus prepared to the action of a solution containing an amount of alkali cyanid slightly less than chemically equivalent to the available acid in said ore, whereby a solution containing hydrocyanic acid and slightly acid in reaction is obtained, and recovering values from the resulting solvent solution.

9. The process of treating refractory ores bearing gold and silver which comprises preliminarily treating a body of such ore to insure its containing a predetermined proportion of an available acid, subjecting the ore thus prepared to the action of a solution containing an amount of alkali cyanid slightly less than chemically equivalent to the available acid in said ore, whereby a solution containing hydrocyanic acid is obtained, withdrawing the solvent solution from the ore, adding an alkaline reagent to the solution, and recovering values from the resulting solution.

10. The cyclic process of treating refractory ores bearing gold and silver which comprises preliminarily treating a body of such ore to insure its containing a predetermined proportion of an available acid, subjecting the ore thus prepared to the action of a solution containing an amount of alkali cyanid slightly less than chemically equivalent to the available acid in said ore, whereby a solution containing hydrocyanic acid is obtained, withdrawing the solvent solution from the ore, adding an alkaline reagent to the solution, recovering values from the resulting solution, and employing the solution from which values have been removed in treating further quantities of ore in the presence of a cyanid-decomposing acid.

11. The process of treating oxidized refractory ores bearing gold and silver which comprises bringing into contact with a body of such ore a solution containing a quantity of alkali cyanid approximately equivalent chemically to the amount of available acid present in said ore, whereby a solution containing hydrocyanic acid, as the active solvent is obtained, said ore being maintained out of contact with air throughout the operation, and finally treating the solvent solution to obtain values therefrom.

In testimony whereof I have signed my name to this specification in the presence of two subscribing witnesses.

JAMES GITSHAM.

Witnesses:
BEDLINGTON BODYCOMB,
MARTHA LEWIS.

---

Copies of this patent may be obtained for five cents each, by addressing the "Commissioner of Patents, Washington, D. C."